May 12, 1931.   G. R. BURRELL   1,805,037
TRACTIVE DEVICE FOR TIRES
Filed May 24, 1928
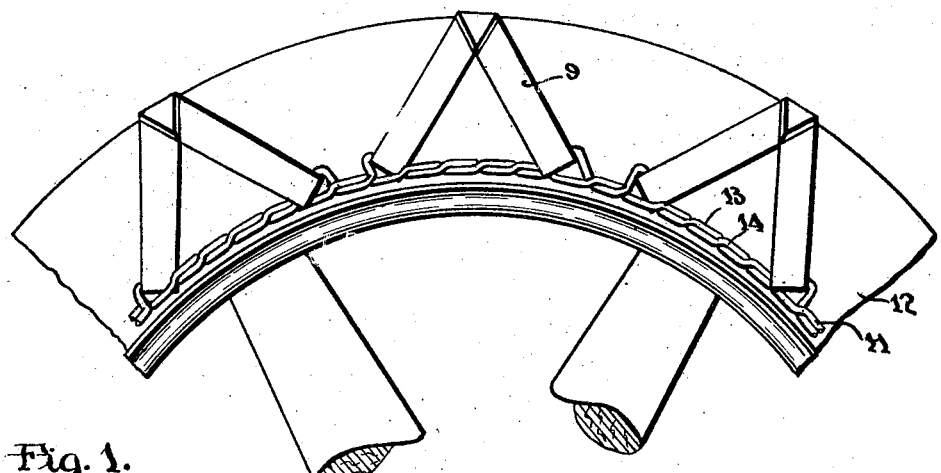
Fig. 1.
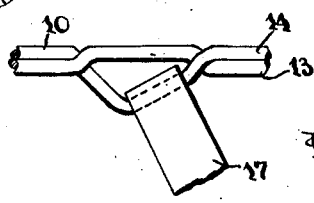
Fig. 2.
Fig. 3.
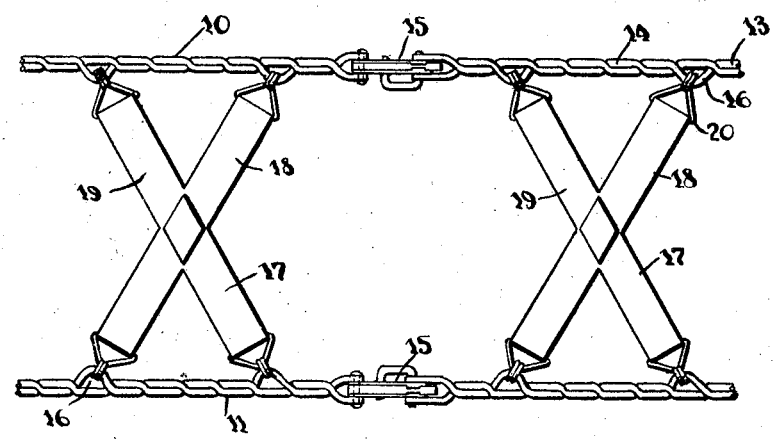
Inventor
George R. Burrell.
By
Attorney Patented May 12, 1931

1,805,037

UNITED STATES PATENT OFFICE

GEORGE R. BURRELL, OF AKRON, OHIO, ASSIGNOR TO THE GOODYEAR TIRE & RUBBER COMPANY, OF AKRON, OHIO, A CORPORATION OF OHIO

TRACTIVE DEVICE FOR TIRES

Application filed May 24, 1928. Serial No. 280,216.

My invention relates to tractive devices for vehicle tires and it has particular relation to devices of the above-designated character commonly known as anti-skid chains.

An object of the invention is to provide an improved side member to be employed in conjunction with the cross links of anti-skid chains.

Another object of the invention is to provide an anti-skid chain in which rubber cross links are connected to the annular members disposed at the sides of the tire, prior to the vulcanization of the cross links.

Heretofore, anti-skid chains have been composed of metallic side links having rubber tractive elements secured transversely thereof, which tractive elements were formed separately by assembling strips of fabric and rubber, folding their ends about suitable metallic anchoring means, and thereafter vulcanizing the assembly. While the service rendered by this type of tractive device has been proven to be very satisfactory, its commercial success might be increased greatly by any material reduction in the manufacturing cost. Moreover, during operation of an anti-skid chain of this type, the anchoring means and the individual links composing the side members slapped back and forth against the tire and consequently caused considerable noise and wear on the tire.

According to an embodiment of the invention, an improved noiseless side member is provided by twisting a plurality of wires together and spreading them at spaced intervals, thereby forming loops or eyes to which the tractive elements are adapted to be secured. Another feature of the invention resides in securing the tractive elements directly to the side members, thus obviating the necessity of having anchoring means between the tractive elements and the side members.

For a better understanding of the invention, reference may now be had to the accompanying drawings, forming a part of the specification, of which;

Figure 1 is an elevational view, showing a portion of a tire having one form of the invention applied thereto;

Figure 2 is a fragmentary plan view of the anti-skid chain shown by Figure 1; and Figure 3 is a fragmentary plan view showing another form of the invention.

Referring to Figures 1 and 3, an anti-skid chain 9, embodying the principles of the invention, includes a pair of side members 10 and 11 disposed upon opposite sides of a tire 12, which members are composed in the present instance of two twisted wires 13 and 14. However, it is to be understood that as many wires may be employed as found desirable to attain proper flexibility of the side members. The side members are provided at opposite ends with releasable fastening devices 15 of conventional construction, which are employed for securing the chains upon a tire. At intervals, the wires 13 and 14 composing the members 10 and 11 are separated materially in order to provide eyes 16. In the construction shown by Fig. 3 elements 17 composed of rubber cross members 18 and 19 are provided at their ends with anchoring means or links 20 adapted to be engaged in oppositely disposed eyes 16 formed in the side members 10 and 11.

In the construction shown by Figures 1 and 2, the tractive elements 17, instead of being connected to the eyes 16 by intermediate anchoring links 20, are connected directly to such eyes. The side members are disposed in parallel relation and the tractive elements are assembled thereon by connecting superimposed strips of rubber and fabric between the eyes 16. Thereafter, the assembled chain is disposed in a suitable mold, and the rubber composing the tractive elements is vulcanized. Preferably, a considerable length of anti-skid chain is formed in this manner and, following the vulcanizing operation, it is cut into individual chain lengths.

From the foregoing description, it is apparent that an anti-skid chain has been provided, in which flexible and noiseless side members of inexpensive manufacture are employed. Moreover, by dispensing with anchoring means between the tractive elements and the side members, the noise incidental to the use of such anchoring means is obviated, and at the same time the cost of construction is decreased materially. Such anti-skid chains are easily assembled upon the tires of motor vehicles, and owing to the relatively small number of movable elements composing a chain, the wear on a tire is negligible.

Although I have illustrated only the preferred forms which the invention may assume, and have described those forms in detail, it will be apparent to those skilled in the art that the invention is not so limited, but that various modifications may be made therein without departing from the spirit of the invetion or from the scope of the appended claims.

What I claim is:

1. In an anti-skid chain, a pair of flexible normally annular members adapted to be supported at the sides of a tire, each member comprising a plurality of twisted metallic wires, said wires being spaced laterally at intervals in the length of the member to form eyes for connecting tractive devices to the members.

2. An anti-skid chain comprising a pair of normally annular members adapted to be supported at the sides of a tire, each member comprising a plurality of twisted elements, said elements being spaced laterally at intervals in the length of the member to form eyes, and rubber tractive devices having their ends looped through the eyes, and vulcanized to form integral connections.

3. An anti-skid chain comprising a pair of normally annular members adapted to be supported at the sides of a tire, each member comprising a plurality of twisted elements, said elements being spaced laterally at intervals in the length of the member to form eyes, and rubber tractive devices having their ends looped about portions of the side members, and vulcanized to form integral connections.

4. An anti-skid chain comprising a pair of normally annular members adapted to be supported at the sides of a tire, each member being provided with circumferentially spaced integral eyes and rubber tractive devices having their ends looped through the eyes and vulcanized to form integral connections.

In witness whereof, I have hereunto signed my name.

Signed at Akron, in the county of Summit and State of Ohio, this 23rd day of May, 1928.

GEORGE R. BURRELL.